(12) United States Patent
Yoo et al.

(10) Patent No.: US 12,611,636 B2
(45) Date of Patent: Apr. 28, 2026

(54) FLOW PATH MEMBER FOR GENERATING NANO-BUBBLES, AND INTEGRATED FLOW PATH UNIT AND NANO-BUBBLE GENERATOR USING SAME

(71) Applicant: FAWOO NANOTECH Co., Ltd., Bucheon-si (KR)

(72) Inventors: Young Ho Yoo, Seoul (KR); Tae Geun Yoo, Seoul (KR); A Ram Yoo, Seoul (KR)

(73) Assignee: FAWOO NANOTECH Co., Ltd., Bucheon-si (KR)

( * ) Notice: Subject to any disclaimer, the term of this patent is extended or adjusted under 35 U.S.C. 154(b) by 311 days.

(21) Appl. No.: 17/272,850

(22) PCT Filed: Apr. 7, 2020

(86) PCT No.: PCT/KR2020/004646
§ 371 (c)(1),
(2) Date: Jan. 28, 2022

(87) PCT Pub. No.: WO2020/242040
PCT Pub. Date: Dec. 3, 2020

(65) Prior Publication Data
US 2022/0212152 A1 Jul. 7, 2022

(30) Foreign Application Priority Data
May 31, 2019 (KR) ........................ 10-2019-0064273

(51) Int. Cl.
*B01F 25/00* (2022.01)
*B01F 23/23* (2022.01)
(Continued)

(52) U.S. Cl.
CPC .................. *B01F 23/23121* (2022.01); *B01F 23/231265* (2022.01); *B01F 23/231269* (2022.01);
(Continued)

(58) Field of Classification Search
CPC . B01F 25/00; B01F 23/23121; B01F 23/1265
See application file for complete search history.

(56) References Cited

U.S. PATENT DOCUMENTS

| | | | | |
|---|---|---|---|---|
| 5,924,456 A | * | 7/1999 | Simon | ................... F16L 11/121 |
| | | | | 138/122 |
| 7,422,035 B2 | * | 9/2008 | Wu | ....................... F16L 11/121 |
| | | | | 138/116 |
| 2015/0053298 A1 | | 2/2015 | Tussy et al. | |

FOREIGN PATENT DOCUMENTS

| | | | | | | |
|---|---|---|---|---|---|---|
| CN | 214315657 U | * | 9/2021 | | | |
| EA | 31074 B1 | | 11/2018 | | | |
| EP | 795365 A1 | * | 9/1997 | ........... | B21C 37/151 | |
| JP | 60-187594 A | | 9/1985 | | | |

(Continued)

*Primary Examiner* — Robert A Hopkins
(74) *Attorney, Agent, or Firm* — NKL LAW; Jae Youn Kim

(57) ABSTRACT

The present disclosure relates to a fluid path member for generating nano-bubbles, and a fluid path integrator and a nano-bubble generator that use the same. The fluid path member may be configured such that a perimeter length of a cross-section of a fluid path is greater than a cross-sectional area of the fluid path so as to maximize a friction area per volume of fluid. In addition, the fluid path member may be configured such that a single fluid path is continuously formed over several tens of meters or more without a joint. Further, the fluid path member may be configured with a high density. Accordingly, the fluid path member may have improved ability to generate the nano-bubbles. A fluid path member configured to generate nano-bubbles according to some embodiments of the present disclosure includes a body formed as a bendable single tube, wherein the body is (Continued)

configured such that one or more dividing walls dividing a fluid path space inside a fluid path so as to expand a surface area and a friction area of a fluid are continuously integrally formed along a flow direction of the fluid, wherein the body is formed of a soft material of any one of silicone, rubber, and soft resin material so as to be freely bent and wound, and wherein the body is manufactured by extrusion molding such that the one or more dividing walls are continuously formed in a longitudinal direction of the body.

8 Claims, 8 Drawing Sheets

(51) Int. Cl.
 *B01F 23/231* (2022.01)
 *B01F 101/00* (2022.01)
 *C02F 1/72* (2023.01)

(52) U.S. Cl.
 CPC ........ *B01F 25/00* (2022.01); *B01F 2101/305* (2022.01); *C02F 1/727* (2013.01)

(56) References Cited

FOREIGN PATENT DOCUMENTS

| | | | |
|---|---|---|---|
| JP | 2002224222 | A | 8/2002 |
| JP | 2002301345 | | 10/2002 |
| JP | 2003027583 | A | 1/2003 |
| JP | 2005283366 | A | 10/2005 |
| JP | 2005305219 | A | 11/2005 |
| JP | 2007021343 | | 2/2007 |
| JP | 2007-196155 | | 8/2007 |
| JP | 2007322007 | A | 12/2007 |
| JP | 2012154495 | A | 8/2012 |
| JP | 2012187549 | | 10/2012 |
| JP | 2014147870 | | 8/2014 |
| JP | 2015-044133 | | 3/2015 |
| JP | 2015044133 | A | 3/2015 |
| JP | 2017077262 | | 4/2017 |
| JP | 2017077262 | A | 4/2017 |
| JP | 2017185457 | | 10/2017 |
| KR | 10-2016-0044897 | | 4/2016 |
| KR | 10-2018-0071616 | | 6/2018 |
| KR | 10-2018-0131664 | | 12/2018 |
| WO | 2010055701 | | 5/2010 |
| WO | 2015073345 | A1 | 5/2015 |
| WO | 2018084543 | | 5/2018 |
| WO | 2018225510 | A1 | 12/2018 |

* cited by examiner (a)

FLOW PATH MEMBER FOR GENERATING NANO-BUBBLES, AND INTEGRATED FLOW PATH UNIT AND NANO-BUBBLE GENERATOR USING SAME

CROSS-REFERENCE TO RELATED APPLICATIONS

This application is a national phase of International Application No. PCT/KR2020/004646, titled "FLOW FLUID PATH MEMBER FOR GENERATING NANO-BUBBLES, AND INTEGRATED FLOW FLUID PATH UNIT AND NANO-BUBBLE GENERATOR USING SAME" and filed on Apr. 7, 2020, which claims the benefit of priority to Korean Patent Application No. 10-2019-0064273, entitled "FLUID PATH MEMBER FOR GENERATING NANO-BUBBLES, AND FLUID PATH INTEGRATOR AND NANO-BUBBLE GENERATOR USING SAME" and filed on May 31, 2019, in the Korean Intellectual Property Office, both of which applications are incorporated herein in their entireties by this reference.

BACKGROUND

1. Technical Field

The present disclosure relates to a fluid path member, and a fluid path integrator and a nano-bubble generator that use the same. The fluid path member may be configured such that a perimeter length of a cross-section of a fluid path is greater than a cross-sectional area of the fluid path so as to maximize a friction area per volume of a fluid. In addition, the fluid path member may be configured such that a single fluid path is continuously formed over several tens of meters or more without a joint. Further, the fluid path member may be integrated with a high density. Accordingly, the fluid path member may remarkably improve the ability to generate nano-bubbles.

2. Background

In general, fine bubbles are divided into micro-bubbles and nano-bubbles according to their size.

The micro-bubbles refer to fine bubbles of 50 μm or less. The micro-bubbles rise to the surface of water at a very slow speed of 0.1 cm/sec, and thus disappear within 2-3 minutes after being generated.

In contrast, the nano-bubbles refer to ultrafine bubbles of several hundred nanometers (nm) or less into which the micro-bubbles are highly micronized. The nano-bubbles have several properties different from the micro-bubbles and ordinary bubbles.

Ordinary bubbles with a diameter of several millimeters or more in a liquid rise rapidly as soon as they are generated, and burst at the surface of the liquid. In contrast, the nano-bubbles have small buoyancy and thus may survive up to tens of hours in the liquid.

As described above, as the nano-bubbles stay in the liquid for a long time, gas inside the bubble passes through the surface of the bubble and slowly dissolves in the liquid. As such, the size of the nano-bubbles gradually becomes smaller. As the size of the bubbles decreases, the ratio of the surface area to the volume of the gas increases. Accordingly, the gas inside the nano-bubbles dissolves in the liquid more quickly and efficiently.

The nano-bubbles are utilized in a wide variety of fields. For example, in the fields of fishing and agriculture, the nano-bubbles are utilized in various forms of aquaculture and hydroponic cultivation. In the field of medicine, the nano-bubbles are utilized for precise diagnosis and physical therapy. In the field of general living, the nano-bubbles are utilized, for example, for high-purity water purification/refining treatment, sterilization, disinfection, deodorization, and cleaning of waste water and waste oil.

For example, in the case of water treatment, it is possible to shorten the treatment time to improve water quality by effectively injecting air into the water. In the case of waste water or waste oil treatment, for example, by effectively injecting a strong oxidizing gas such as ozone into the waste water or the waste oil, it is possible to effectively decompose or remove various malodorous substances contained in the waste water or the waste oil.

While the gas-liquid mixed fluid flows under pressure in the fluid path, the gas-liquid mixed fluid contacts the inner surface of the fluid path. Due to this contact, friction occurs between the inner surface of the fluid path and the surface layer of the fluid. The gas-liquid mixed fluid is micronized to reduce a frictional drag against such friction. The nano-bubbles are generated through this micronization process.

An existing nano-bubble generator disclosed in the related art, for example, has a structure in which, so as to lengthen a fluid path in which the friction occurs, the fluid path is wound in a zigzag form inside a chamber, or a structure which uses a cutter-type rotating body to apply a shearing pressure to the fluid.

The existing nano-bubble generator is configured such that interlayer members are installed in a zigzag form in a chamber so as to form a zigzag-shaped fluid path having a length required to generate the nano-bubbles, or such that multiple rotating bodies are installed. Accordingly, the existing nano-bubble generator becomes a large weight body with a complex structure.

Accordingly, since the existing nano-bubble generator is very complex and expensive to manufacture, it tends to have a low productivity relative to cost. In addition, since the existing nano-bubble generator occupies a large space, it is difficult to use it in small workplaces or general homes.

Further, since the length of the fluid path is inevitably limited, a micronization quality and an amount of the nano-bubbles are insufficient.

SUMMARY

The present disclosure has been devised to address the limitations mentioned above.

The present disclosure is directed to providing a fluid path member for generating nano-bubbles. The fluid path member may be configured such that a perimeter length of a cross-section of a fluid path is greater than a cross-sectional area of the fluid path so as to maximize a friction area per volume of a fluid, wherein the fluid path serves as a basis for generating the nano-bubbles. Further, the fluid path member is formed as a freely bendable single tube in which the fluid path may be continuously formed over several tens of meters or more without a joint. Accordingly, the fluid path member may have improved ability to generate the nano-bubbles and improved economy.

The present disclosure is further directed to providing a fluid path member for generating nano-bubbles and a fluid path integrator using the same. Herein, since the fluid path member may be freely bent by only a force of an operator, the fluid path member may be freely installed even in a narrow space. In addition, the fluid path member may be densely integrated. Accordingly, a nano-bubble generator in which the fluid path member is employed may be formed in a simple configuration.

The present disclosure is still further directed to providing a nano-bubble generator using the fluid path member and the fluid path integrator. Herein, since the nano-bubble generator becomes smaller and lighter by using the fluid path member and the fluid path integrator, the manufacturing cost of the nano-bubble generator may be reduced, and the space efficiency of the nano-bubble generator may also be improved. Accordingly, the nano-bubble generator may be easily applied not only in large facilities, but also in small workplaces and general homes.

A fluid path member for generating nano-bubbles according to the present disclosure includes a body formed as a bendable single tube. The body may be configured such that one or more dividing walls dividing a fluid path space inside a fluid path so as to expand a surface area and a friction area of a fluid are continuously integrally formed along a flow direction of the fluid.

The body is formed of a soft material of any one of silicone, rubber, and soft resin material so as to be freely bent and wound, and is manufactured by extrusion molding such that the dividing walls are continuously formed in a longitudinal direction of the body.

At least one of one or more protrusions or fine convex portions for further expanding the friction area of the fluid may be formed continuously integrally with the body along the flow direction of the fluid in an inner surface of the fluid path including the dividing walls.

A pipe joint from which the dividing walls are removed to insert a connection pipe may be provided in a partial section of at least one of both ends of the fluid path.

A fluid path member for generating nano-bubbles according to some embodiments of the present disclosure includes a body formed as a bendable single tube, wherein the body is configured such that one or more space dividers dividing a fluid path space inside a fluid path so as to expand a surface area and a friction area of a fluid are continuously integrally formed along a flow direction of the fluid. Front ends of the space dividers are located in the space of the fluid path such that an entire space of the fluid path is integrally communicated. The body is formed of a soft material of any one of silicone, rubber, and soft resin material so as to be freely bent and wound. Further, the body is manufactured by extrusion molding such that the space dividers are continuously formed along a longitudinal direction of the body.

At least one of one or more protrusions or fine convex portions for expanding the friction area of the fluid may be formed continuously integrally with the body along the flow direction of the fluid in an inner surface of the fluid path including the space dividers.

The fluid path is formed as a tube-shaped body, wherein an expansion preventing member for preventing an outer diameter of the tube-shaped body from being expanded and deformed may be provided on the tube-shaped body.

A fluid path integrator according to the present disclosure is configured such that the fluid path member for generating the nano-bubbles is continuously wound and then stacked, thereby causing the fluid path to also be continuously wound and then stacked.

A nano-bubble generator according to the present disclosure includes the fluid path member for generating the nano-bubbles.

The fluid path member for generating the nano-bubbles according to the present disclosure has the following effects.

Since a perimeter length of a cross-section of the fluid path is greater than a cross-sectional area of the fluid path by forming the dividing walls or the space dividers inside the fluid path, the surface area and friction area of the fluid may be significantly increased. In addition, the fluid path member is configured as a single tube formed of a bendable soft material, in which the fluid path may be continuously formed over several tens of meters or more without a joint. Further, the fluid path member may be integrated with a high density. Accordingly, the ability of the fluid path member to generate the nano-bubbles and the economy of the fluid path member may be remarkably improved.

In addition, since the fluid path member may be freely bent by only the force of an operator, the fluid path member is easy to install even in a narrow space. Accordingly, a range of application of the nano-bubbles may be enlarged.

In addition, since the fluid path member is integrated with a high density, the structure of the nano-bubble generator may become simpler, smaller, and lighter, thereby reducing manufacturing cost. Further, since the nano-bubble generator has improved space utilization, the nano-bubble generator may be applied not only in large facilities, but also in small workplaces and general homes, thereby greatly enlarging the range of application of the nano-bubbles.

BRIEF DESCRIPTION OF THE DRAWINGS

FIGS. 3 (*a*) and (*b*) are views illustrating a configuration of a fluid path member for generating nano-bubbles according to some embodiments of the present disclosure, where (a) is a cross-sectional view with a portion of the configuration omitted, and (b) is a cross-sectional view taken along line A-A of (a).

DETAILED DESCRIPTION

Hereinafter, embodiments of a fluid path member for generating nano-bubbles according to the present disclosure will be described in more detail with reference to the accompanying drawings.

All objects generate heat while moving under pressure. In this process, a friction surface of the object is broken down by heat from a point in time when a speed and a pressure of the object reach a critical point. At this time, a phenomenon of reducing the frictional force of the object occurs.

This phenomenon can be observed in the phenomenon in which as heat is generated on ice at a location where a skate blade passes, the ice at that location melts and becomes slippery.

For example, when a frictional force is applied to a gas-liquid mixed fluid in which water and oxygen are mixed, oxygen bubbles contained in a fluid are divided and micronized to minimize the frictional force. Water in which fine bubbles are generated has a characteristic in which a temperature rises and becomes slippery compared to water before the fine bubbles are generated.

According to this principle, the gas-liquid mixed fluid causes friction with an inner surface of the fluid path in a surface layer of the fluid while passing through the fluid path at a flow rate of more than a critical speed. At this time, in order to reduce the frictional pressure between the surface layer of the fluid and the inner surface of the fluid path, bubbles contained in the fluid are micronized. During such micronization, the nano-bubbles are generated when the fluid has moved beyond a critical flow distance.

Accordingly, when a unit volume of fluid contacts the inner surface of the fluid path, as an area of the surface layer of the fluid, a coefficient of friction and a flow speed are higher, a duration of friction is longer, and a liquid contains more gases, nano-bubbles that are better in quantity and quality may be generated.

The present disclosure has been conceived in consideration of a principle of generating nano-bubbles according to a friction of the fluid, and a friction efficiency of the fluid.

Figure 1:
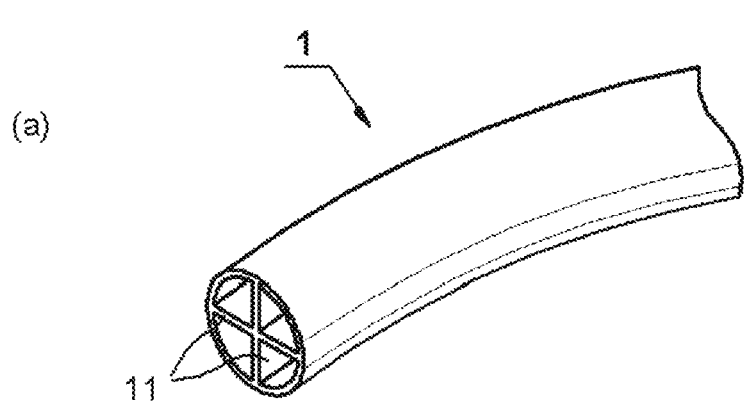
FIGS. 1 (*a*), (*b*), (*c*) and (*d*) are views illustrating a configuration of a fluid path member for generating nano-bubbles according to some embodiments of the present disclosure, where (a) is a perspective view, (b) is an enlarged longitudinal cross-sectional view of (a), and (c) and (d) are longitudinal sectional views of another embodiment.
Figure 1:
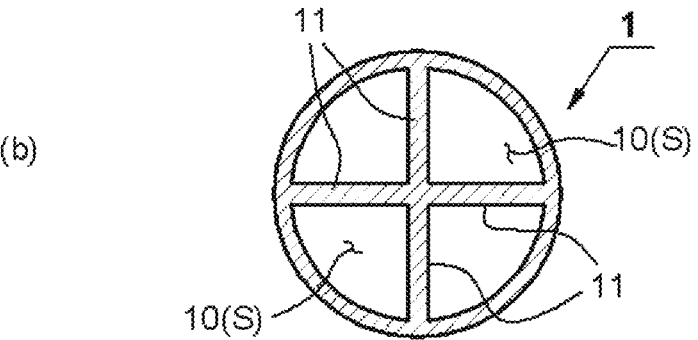
Figure 1:
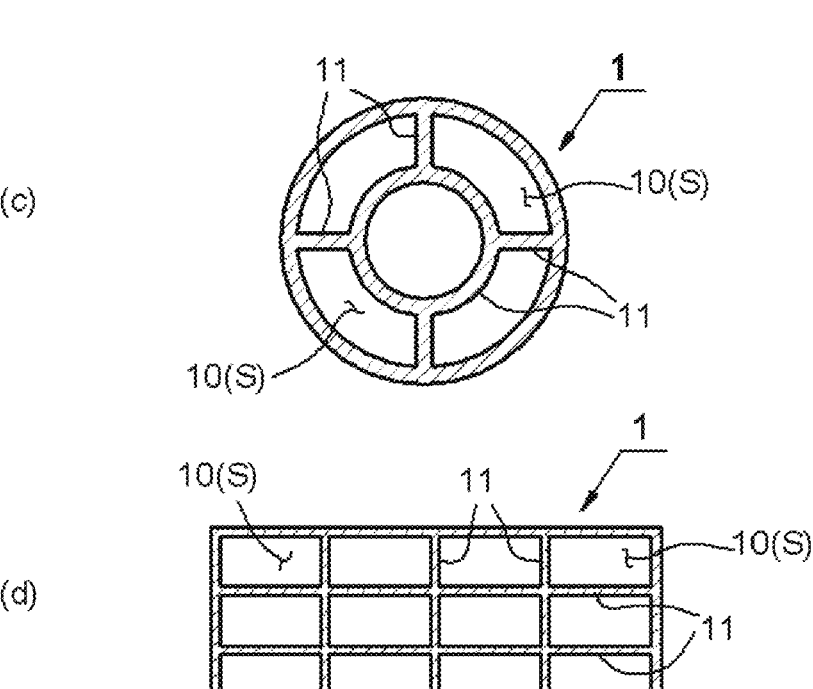
Figure 2:
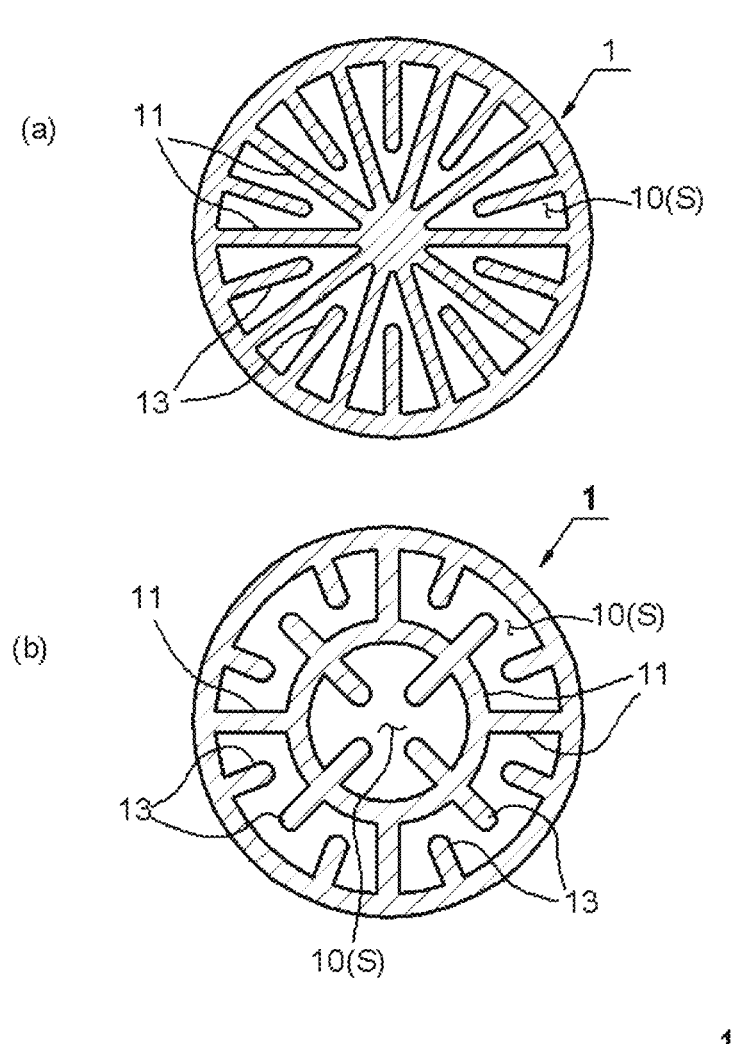
FIGS. 2 (*a*), (*b*), and (*c*) are longitudinal cross-sectional views of a fluid path member for generating nano-bubbles, respectively, according to some embodiments of the present disclosure.
Figure 2:
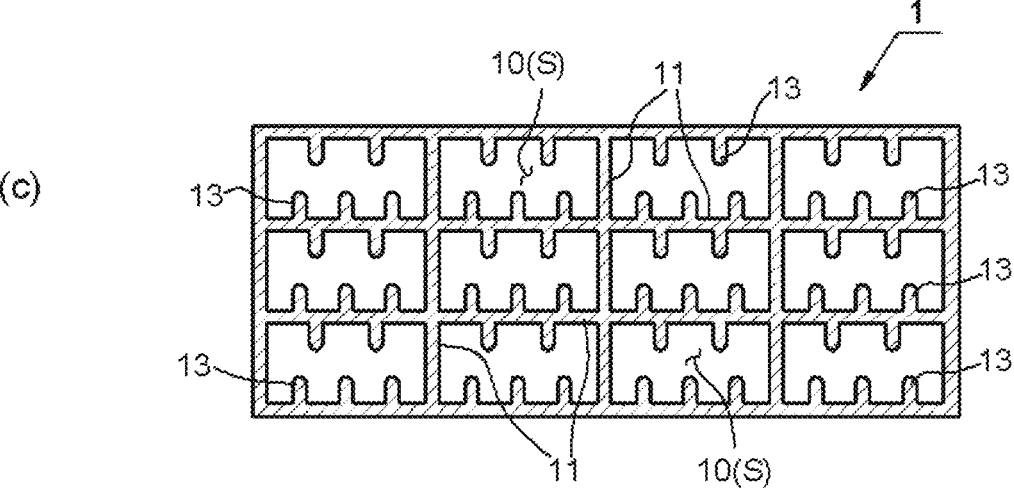
Figure 3:
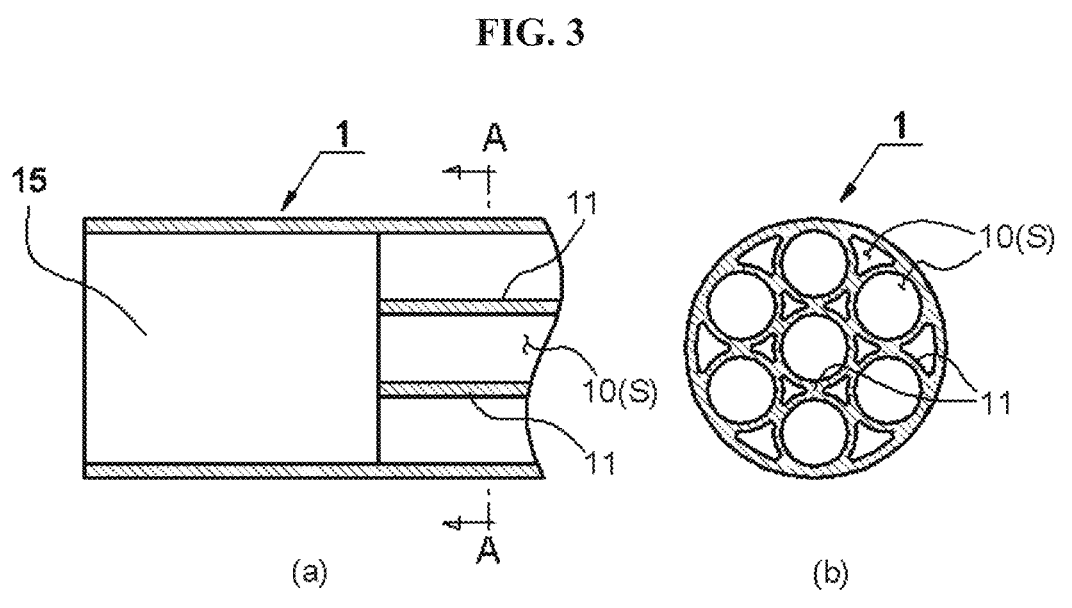

A fluid path member 1 for generating nano-bubbles according to a first embodiment of the present disclosure is configured such that a body thereof is formed as a bendable single tube, as illustrated in FIGS. 1 to 3. The body is configured such that one or more dividing walls 11 dividing a fluid path space S inside a fluid path 10 so as to expand a surface area and a friction area of the fluid are integrally formed along a flow direction of the fluid. In addition, the body is formed of a soft material of any one of silicone, rubber, and soft resin material in order to be freely bent and wound. Further, the body is manufactured by extrusion molding such that the dividing walls are continuously formed in a longitudinal direction of the body.

As used herein, the term "the fluid path space (S)" refers to a cross-sectional space orthogonal to a longitudinal direction of the fluid path.

As illustrated in FIG. 2, at least one of one or more protrusions 13 and fine convex portions (not shown) for further expanding the friction area of the fluid may be formed continuously integrally with the body along the flow direction of the fluid in an inner surface of the fluid path 10 including the dividing walls 11.

In addition, as illustrated in FIG. 3, a pipe joint 15 from which the dividing walls 11 are removed to insert a connection pipe may be provided in at least one of both ends of the fluid path 10.

The pipe joint 15 is formed such that the dividing walls 11 are removed by a predetermined portion in order to prevent interference when the connection pipe is inserted into the fluid path member 1.

A cross-section of the fluid path member 10 described above (hereinafter, the term "cross-section" refers to a longitudinal cross-section orthogonal to the flow direction of the fluid in the body of the fluid path member 10—see drawings other than FIG. 1) may vary in shape.

A outer shape of the cross section of the fluid path member 1 formed as a single tube may have various shapes such as a circle, an oval, and a polygon, and may be formed in various shapes including a divided shape or a radial shape (see FIGS. 1 to 3).

The fluid path member 1 as described above is configured such that the fluid path is densely divided into a small cross-sectional area by the dividing walls 11. In such a case, the fluid path member 1 has a very long perimeter length per unit area in a cross section of the fluid path space S. In addition, for example, as the protrusions 13 are further formed in the fluid path, a friction area between the gas-liquid mixed fluid and an inner wall of the fluid path may be remarkably increased.

Accordingly, the ability to generate the nano-bubbles may be remarkably improved. In addition, a length of the fluid path per an amount of the nano-bubbles generated may be shortened.

Figure 4:
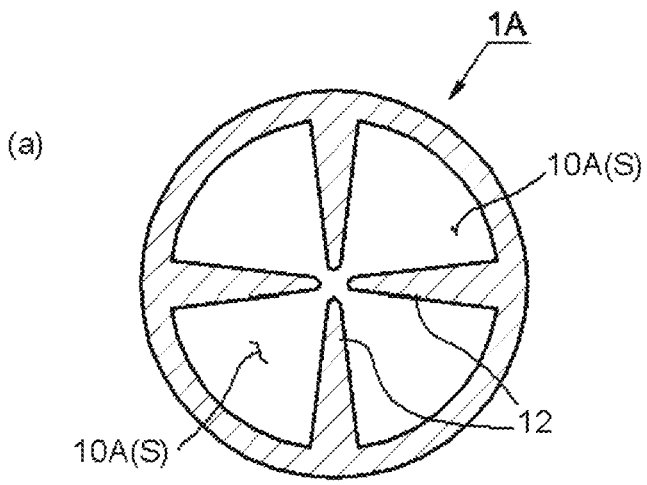
FIGS. 4 (*a*), (*b*), and (*c*) are longitudinal cross-sectional views illustrating a configuration of a fluid path member for generating nano-bubbles, respectively, according to some embodiments of the present disclosure.
Figure 4:
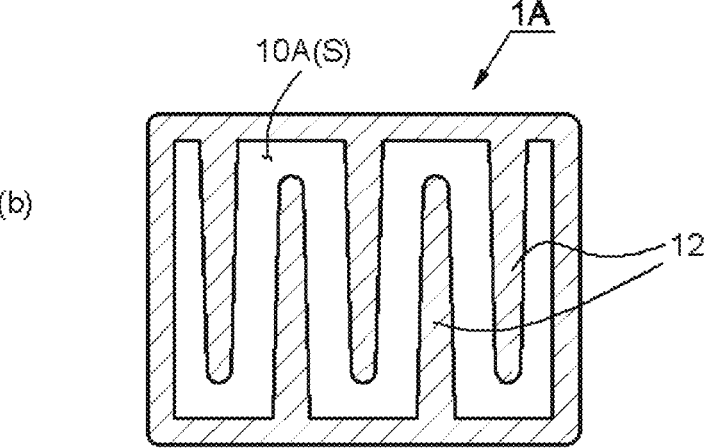
Figure 4:
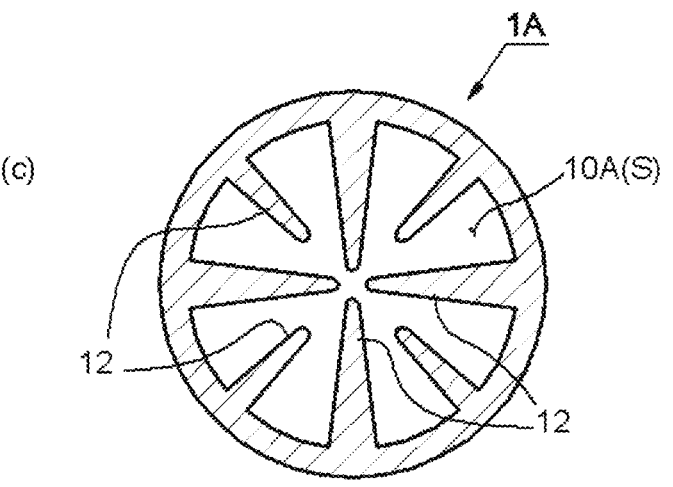
Figure 5:
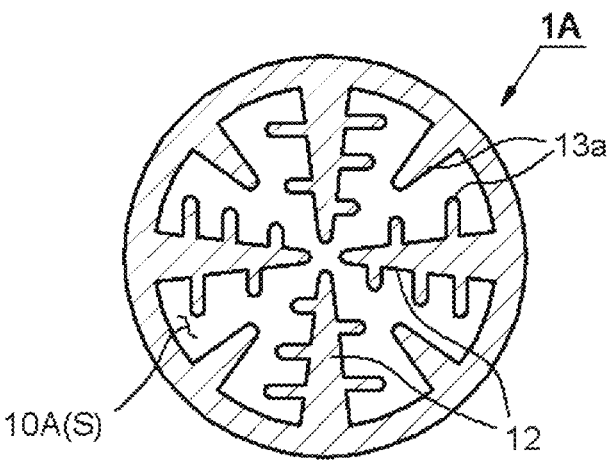
FIG. 5 is a longitudinal cross-sectional view illustrating a configuration of a fluid path member for generating nano-bubbles according to some embodiments of the present disclosure.

A fluid path member 1A for generating nano-bubbles according to a second embodiment of the present disclosure is configured such that a body thereof is formed as a bendable single tube, as illustrated in FIGS. 4 and 5. In addition, the body is configured such that one or more space dividers 12 dividing a fluid path space S inside a fluid path 10A so as to expand a surface area and a friction area of a fluid are integrally formed along a flow direction of the fluid. Since front ends of the space dividers 12 are located in the fluid path space S, an entire space of the fluid path is integrally communicated. The body is formed of a soft material of any one of silicone, rubber, and soft resin material so as to be freely bent and wound. In addition, body is manufactured by extrusion molding such that the space dividers 12 are continuously formed along a longitudinal direction of the body.

As used herein, the term "the fluid path space S" also refers to a cross-sectional space orthogonal to a longitudinal direction of the fluid path.

As described above, the space dividers 12 are formed to protrude from an inner surface of the fluid path 10A into the fluid path space S. In addition, the fluid path space S of the fluid path is densely divided by the space dividers 12. Accordingly, a perimeter length of a cross-section of the fluid path, and the surface area and the friction area of the fluid may be remarkably increased.

The cross section of the fluid path 10A may also be formed in various shapes. When the cross section of the fluid path 10A has a circular shape, the space dividers 12 preferably protrude to a length equal to or greater than ⅓ of a radius of the fluid path, but are not limited thereto.

When the cross-section of the fluid path 10A has a rectangular shape, the space dividers 12 may alternately protrude from opposite inner surfaces of the fluid path (see FIG. 4 (*b*)). However, regardless of the shape of the cross-section of the fluid path 10A, a protruding length of the space dividers 12 may be jagged (see FIG. 4 (c)).

As the space dividers 12 are formed longer and more densely, the space dividers 12 may advantageously expand the friction area with the fluid.

Further, at least one of one or more protrusions 13a (refer to FIG. 5) and fine convex portions (not shown) for expanding the friction area of the fluid may be formed continuously integrally with the body along the flow direction of the fluid in the inner surface of the fluid path 10A including the space dividers 12.

The fluid path member 1A for generating the nano-bubbles according to the second embodiment of the present disclosure may be provided with a pipe joint 15 as in the case of the first embodiment of the present disclosure.

Like the fluid path member 1 for generating the nano-bubbles according to the first embodiment, the fluid path member 1A for generating the nano-bubbles according to the second embodiment is also configured such that the cross-sectional space of the fluid path is densely divided by the space dividers 12. Accordingly, as the perimeter length of the cross section of the fluid path space becomes significantly greater than the cross-section area of the fluid path space, the surface layer of the gas-liquid mixed fluid, that is, the friction area, may be remarkably expanded. In such a case, the nano-bubbles may be generated more efficiently.

The fluid used in the fluid path member 1 and 1A so as to generate the nano-bubbles may be a mixture of water and air, a mixture of water and other liquids and air, a mixture of water and air, for example additional gases such as oxygen (O2), ozone (O3), and hydrogen (H2), and a mixture of an industrial oil and additional gases such as oxygen (O2), ozone (O3), and hydrogen (H2).

The fluid may be tap water containing bubbles generated during a transmission process.

Figure 6:
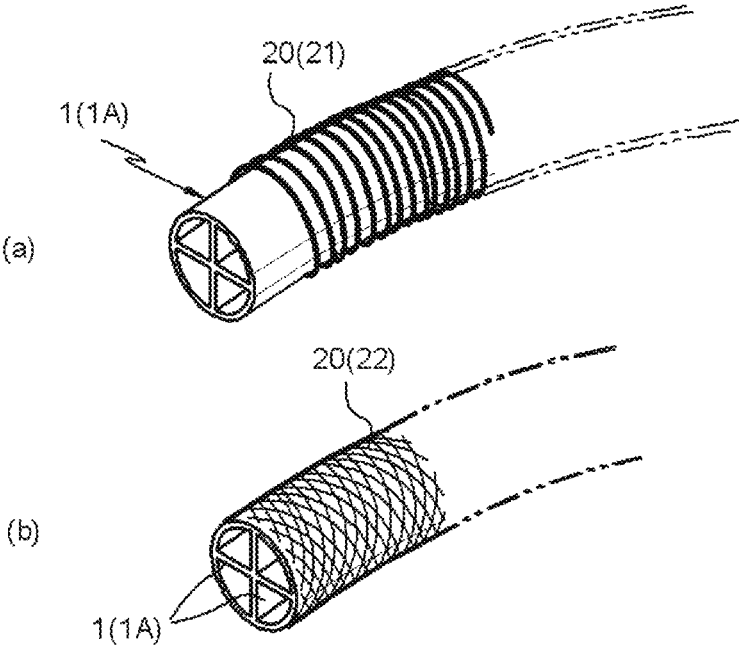
FIGS. 6 (*a*) and (*b*) are views illustrating a configuration including an expansion preventing member for preventing expansion of a fluid path member according to some embodiments of the present disclosure.

In addition, as illustrated in FIG. 6, the fluid path 10 and 10A are formed in a tube shape. An expansion preventing member 20 for preventing an outer diameter of the body from being expanded and deformed may be provided on the body of the tube-shaped fluid path 10 and 10A.

Since the fluid path member 1 and 1A is formed of a soft material such as silicon, when a pressure of the fluid is high, the outer diameter of the fluid path member 1 and 1A may be expanded.

The expansion preventing member 20 is fitted to the outside of the body of the tube-shaped fluid path 10 and 10A so as to keep the outer diameter of the fluid path constant. The expansion preventing member 20 may be, for example, in the form of a coil spring 21 (see FIG. 6 (a)) or in the form of a mesh tube 22 (see FIG. 6 (b)), but is not limited thereto.

In addition, since the fluid path member 1 and 1A is for example formed of a soft material such as silicon, the fluid path member 1 and 1A may be freely bent in various shapes by only the force of an operator. Further, since the fluid path member 1 and 1A provided with the dividing walls 11 or the space dividers 12 is manufactured by extrusion molding, the fluid path member 1 and 1A may be continuously formed over several tens of meters or more.

Figure 7:
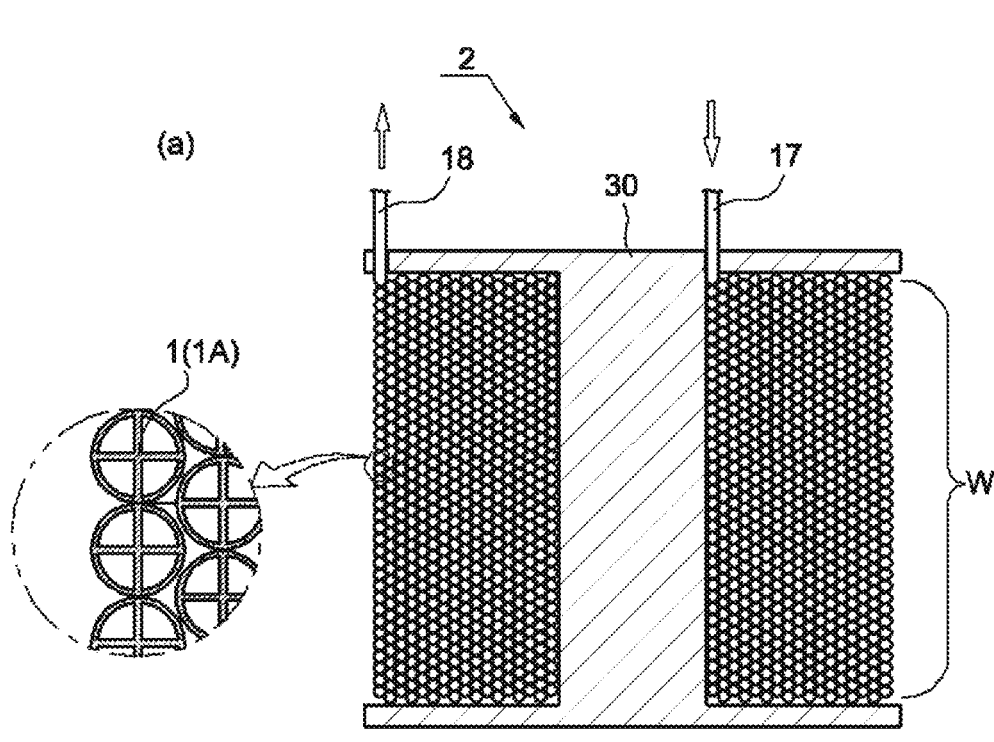
FIGS. 7 (*a*) and (*b*) are views illustrating a fluid path integrator according to some embodiments of the present disclosure, where (a) is a longitudinal cross-sectional view of the fluid path integrator, and (b) is a top view of (a).
Figure 7:
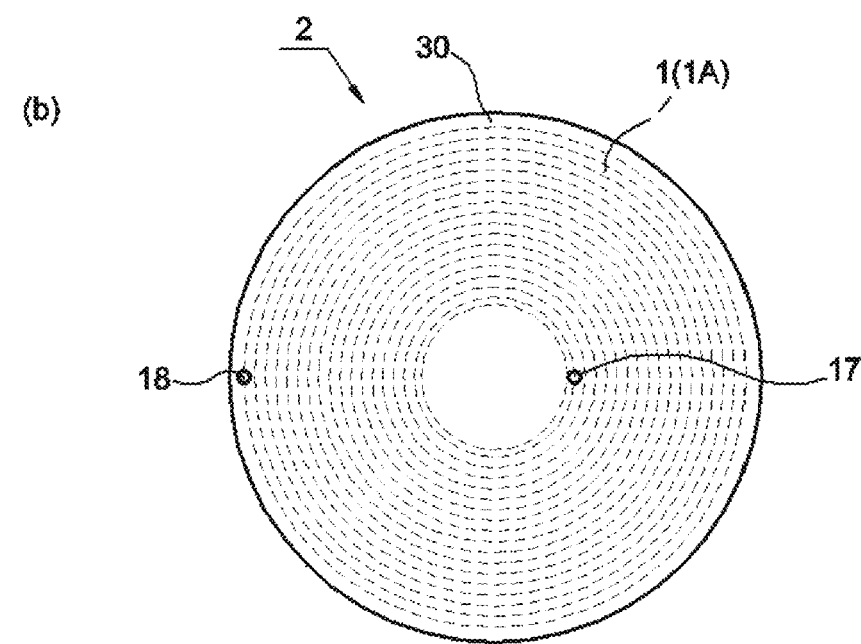

As illustrated in FIG. 7, a fluid path integrator 2 according to some embodiments of the present disclosure includes the fluid path member 1 and 1A, wherein since the fluid path member 1 and 1A formed as the single tube using the characteristics of the fluid path member described above is continuously wound and then stacked, the fluid path 10 and 10A is also configured to be continuously wound and then stacked.

The fluid path integrator 2 may be formed by winding the fluid path member using a winding means such as a winding wheel 30. Alternatively, a wad (W), which is the fluid path integrator 2, in which the fluid path member is wadded, may be configured such that the fluid may flow smoothly from an inlet 17 to an outlet 18.

The fluid path integrator 2 is configured such that as a row of the fluid path member 1 and 1A formed in length of several tens of meters or more is wadded, the fluid path is wound and then stacked with a high density. As the fluid path is wound with a high density, the friction surface and the friction duration of the fluid against the space are remarkably increased, which may improve the ability to generate the nano-bubbles.

Figure 8:
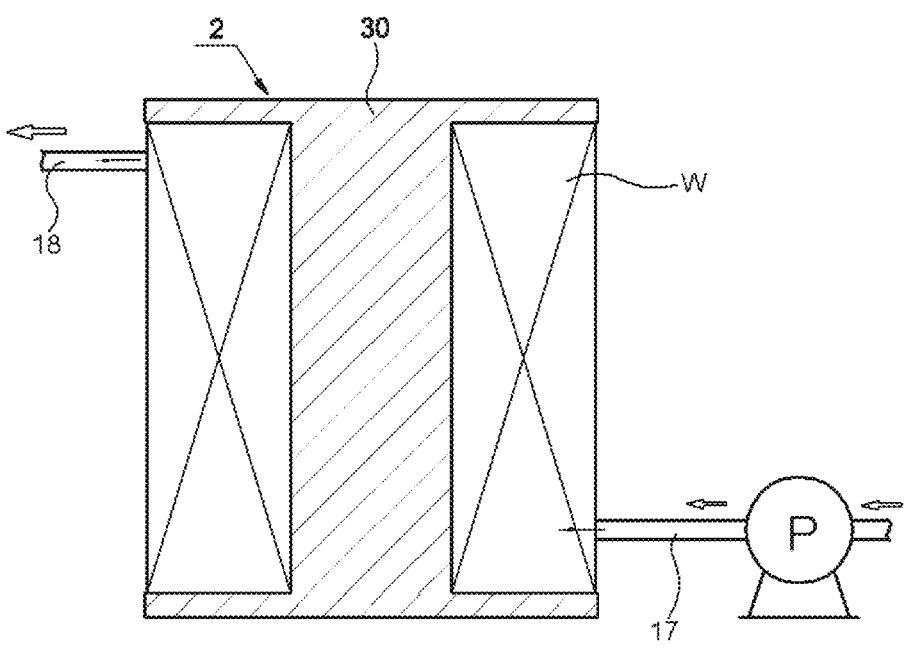
FIG. 8 is a schematic longitudinal cross-sectional view of a fluid path integrator according to some embodiments of the present disclosure.
Figure 9:
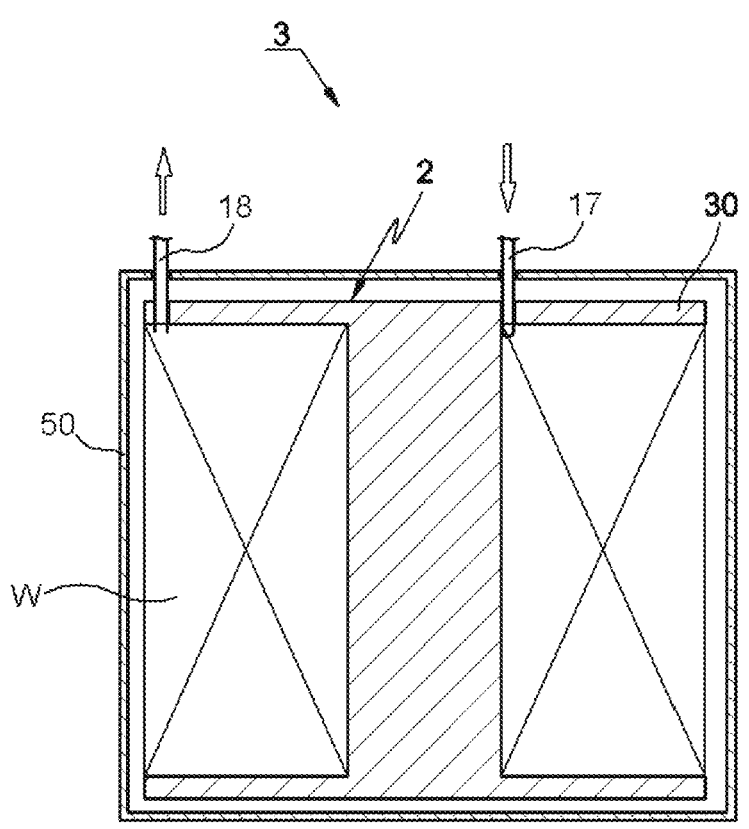
FIG. 9 is a schematic longitudinal sectional view of a nano-bubble generator according to some embodiments of the present disclosure.
Figure 10:
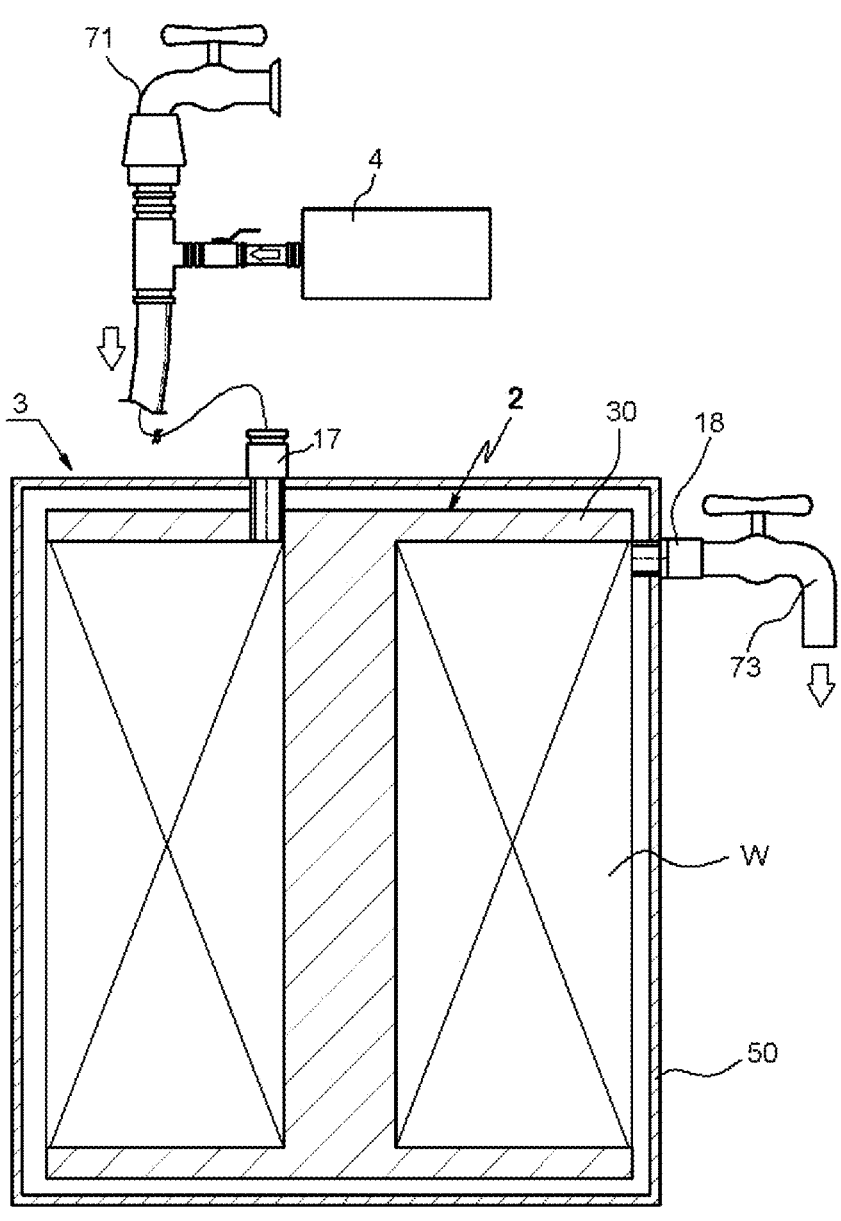
FIG. 10 illustrates a schematic application state diagram of a nano-bubble generator according to some embodiments of the present disclosure.

For example, when the fluid is injected into the fluid path integrator 2 using a pressure pump P for the transmission, the nano-bubbles may be easily generated even in a narrow space (see FIGS. 8 to 10).

As illustrated in FIG. 9, a nano-bubble generator 3 according to the present disclosure is configured to include the fluid path member 1 and 1A, wherein the fluid path integrator 2 into which the fluid path member 1 and 1A is wadded may be installed in the nano-bubble generator 3.

The nano-bubble generator 3 according to some embodiments of the present disclosure may be configured such that one or more fluid path integrators 2 are received within a casing 50. The inlet 17 and the outlet 18 of the fluid path member may be installed in one simple integrated structure connected to the outside of the casing 50.

In addition, the wad (W) of the fluid path member, which is the fluid path integrator 2, may be installed to be sequentially connected such that the fluid is continuously recirculated (not shown).

As illustrated in FIG. 10, in the nano-bubble generator 3, the inlet 17 may be directly connected to a general tap water faucet 71, and the outlet 18 may be directly connected to a water outlet 73.

In addition, it will be appreciated by those skilled in the art that a means 4 for supplying additional gases such as oxygen (O2), ozone (O3) and hydrogen (H2) may be added between the tap water faucet 71 and the inlet 17.

As described above, since the fluid path member 1 and 1A for generating the nano-bubbles according to the present disclosure includes, for example, dividing walls 11 and space dividers 12 that divide the cross-sectional space of the fluid path, the friction surface per volume of fluid may be maximized, thereby efficiently generating the nano-bubbles by the frictional force.

Since the fluid path member is formed of a soft material such as silicone, the fluid path member may be freely bent by only the force of an operator. In addition, the fluid path member may continuously be formed over several tens of meters or more by the extrusion molding. Accordingly, the fluid path member may be integrated with a high density by winding and then stacking it multiple times, for example, using a spool.

As described above, the nano-bubbles are generated through the process in which the fluid is micronized to reduce frictional pressure between the surface layer of the fluid and the body forming the fluid path. As described above, since the fluid path member is configured to significantly increase the length of perimeter per unit area in the cross section of the fluid path, the friction area of the fluid may be expanded, thereby improving the ability to generate the nano-bubbles.

In addition, since the friction area of the fluid is expanded and the friction continuously occurs for up to several tens of meters, not only the ability to generate the nano-bubbles, but also the quality of the nano-bubbles determined by the miniaturization of the bubbles may be remarkably improved.

Further, since the fluid path integrator 2 according to the present disclosure is formed by wadding the fluid path member 1 and 1A having the fluid path 10 and 10A with high density, the fluid path integrator 2 may become smaller and lighter. Accordingly, it is easy to handle and manage the fluid path integrator 2. In addition, the space utilization of the fluid path integrator 2 is improved. As a result, the fluid path integrator 2 may be applied not only in large facilities, but also in small workplaces and general homes, thereby greatly enlarging a range of application of the nano-bubbles.

In addition, since the fluid path integrator 2 may be simply manufactured by only winding one tube-shaped fluid path member over several tens of meters or more, it is possible to generate and use the nano-bubbles at very low cost.

Further, the nano-bubble generator 3 configured with the fluid path member 1 and 1A and/or the fluid path integrator 2 may shorten the length of the fluid path per the amount of nano-bubbles generated. Furthermore, unlike the related art, the nano-bubble generator 3 may be easily manufactured without being constrained to a fluid path chamber, thereby significantly reducing the manufacturing cost.

Furthermore, since the fluid path member is formed of the bendable soft material, the fluid path member is easily installed in a corner space such as a washing machine or a household bathtub, or even in a space requiring various types of bending. Accordingly, since the fluid path member may remarkably enlarge the range of application of nano-bubbles, the fluid path member may be easily applied not only in large facilities, but also in small workplaces and general homes.

As described above, since the properties of the nano-bubbles and their application are already known to those skilled in the art, the present disclosure is applicable to all available fields and may also be provided as products for various purposes.

In the preceding description, preferred embodiments of the present disclosure have been described with reference to the accompanying drawings.

The terms or words used in the specification and claims should not be construed as being limited to typical or dictionary meanings, but should be construed as the meaning and concept corresponding to the technical idea of the present disclosure. Accordingly, the configurations illustrated in embodiments and drawings described in the specification are only a preferred embodiment of the present disclosure and do not represent all technical idea of the present disclosure. Thus, as of the time of filing the present application, it should be understood that various equivalents and modifications may exist, which may replace the configurations illustrated in the embodiments and drawings described above.

The nano-bubble generator composed of the fluid path member according to the present disclosure may significantly improve the frictional efficiency of the fluid, thereby efficiently generating the nano-bubbles and remarkably reducing the manufacturing cost.

In addition, the nano-bubble generator composed of the fluid path member according to the present disclosure become smaller and lighter, thereby making it possible to easily generate the nano-bubbles not only in large facilities, but also in small workplaces and general homes.

The present disclosure thus has industrial applicability.

What is claimed is:

1. A fluid path member to generate nano-bubbles, comprising:
   a body formed as a bendable single tube configured to generate nano-bubbles,
   wherein the body is configured such that one or more dividing walls divide a fluid path space of the bendable single tube into a plurality of fluid paths which are formed in a predetermined density level so as to expand a surface area and a friction area of a gas-liquid mixed fluid and are continuously formed along a flow direction of the gas-liquid mixed fluid and along a longitudinal direction of the body,
   wherein the body is formed of a material of any one of silicone, rubber, and resin so as to be capable to be bent and wound, and
   wherein the body includes the one or more dividing walls continuously formed in the longitudinal direction of the body, and
   further comprising one or more protrusions or one or more convex portions with a predetermined thickness for further expanding the surface area and the friction area of the gas-liquid mixed fluid formed continuously with the body along the flow direction of the fluid and extending being cantilevered from an inner surface of the body and into the plurality of fluid paths.

2. The fluid path member of claim 1, wherein an expansion preventing member for preventing an outer diameter of the bendable single tube from being expanded and changed is provided on the bendable single tube.

3. A fluid path integrator comprising the fluid path member configured to generate the nano-bubbles according to claim 1, wherein the fluid path member is continuously wound and then stacked such that the fluid path is continuously wound and then stacked.

4. A nano-bubble generator comprising the fluid path member configured to generate the nano-bubbles according to claim 1.

5. A fluid path member to generate nano-bubbles, comprising:
   a body formed as a bendable single tube configured to generate nano-bubbles,
   wherein the body is configured such that one or more space dividers divide, in a predetermined density level, a fluid path space into a plurality of fluid paths so as to expand a surface area and a friction area of a gas-liquid mixed fluid and is continuously formed along a flow direction of the fluid and along a longitudinal direction of the body,
   wherein front ends of the one or more space dividers are located in the fluid path space such that an entire fluid path space is communicated,
   wherein the body is formed of a material of any one of silicone, rubber, and resin so as to be capable to be bent and wound, and
   wherein the body includes the one or more space dividers continuously formed along the longitudinal direction of the body, and
   further comprising one or more protrusions or one or more convex portions with a predetermined thickness for further expanding the surface area and the friction area of the gas-liquid mixed fluid formed continuously with the body along the flow direction of the fluid and extending being cantilevered from an inner surface of the body and into the plurality of fluid paths.

6. The fluid path member of claim 5, wherein an expansion preventing member for preventing an outer diameter of the bendable single tube from being expanded and changed is provided on the bendable single tube.

7. A fluid path integrator comprising the fluid path member configured to generate the nano-bubbles according to claim 5, wherein the fluid path member is continuously wound and then stacked such that the fluid path is continuously wound and then stacked.

8. A nano-bubble generator comprising the fluid path member configured to generate the nano-bubbles according to claim 5.

\* \* \* \* \*